US006525994B2

(12) United States Patent
Donald et al.

(10) Patent No.: US 6,525,994 B2
(45) Date of Patent: Feb. 25, 2003

(54) TRACKING SYSTEM AND METHOD OF OPERATION THEREOF

(75) Inventors: James B. Donald, Pawcatuck, CT (US); James H. Wilson, San Clemente, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/853,933

(22) Filed: May 11, 2001

(65) Prior Publication Data

US 2002/0181329 A1 Dec. 5, 2002

(51) Int. Cl.$^7$ .................................................. G01S 3/80
(52) U.S. Cl. ........................ 367/130; 367/118; 367/124
(58) Field of Search ................................. 367/130, 129, 367/124, 121, 119, 118, 901; 702/143, 152

(56) References Cited

U.S. PATENT DOCUMENTS 5,481,505 A * 1/1996 Donald et al. .............. 367/130

OTHER PUBLICATIONS

Dr. James H. Wilson, Inverse Beamforming, 1997, www.neptunesci.com/ibf.htm.*

* cited by examiner

*Primary Examiner*—Daniel T. Pihulic
(74) *Attorney, Agent, or Firm*—James M. Kasischke; Michael F. Oglo; Jean-Paul Nasser

(57) ABSTRACT

A method and apparatus for detecting, processing and tracking sonar signals to provide bearing, range and depth information that locates an object in three-dimensions underwater space. A Twenty Six Nearest Neighbor Peak Picker (TSNNPP) is disclosed that improves the detection of signals in noisy background by differentiating bandwidth (BW) characteristics of signals from BW characteristics of noise.

4 Claims, 4 Drawing Sheets

|  | AZIMUTH 1 | AZIMUTH 2 | AZIMUTH 3 |
|---|---|---|---|
| FREQUENCY BIN 1 | 4 | 2 | −1 |
| FREQUENCY BIN 2 | 3 | ⑧ PEAK | 2 |
| FREQUENCY BIN 3 | 0 | 6 | 5 |

FIG-2
PRIOR ART

TRACKING SYSTEM AND METHOD OF OPERATION THEREOF

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention generally relates to sonar systems and more specifically to sonar systems particularly adapted for identifying the location of an underwater object.

(2) Description of the Prior Art

Conventional passive sonar systems detect acoustic signals emanating from an underwater object; that is, any device that moves through the water while emitting acoustic signals that sonar can detect. Torpedoes and submarines are examples of such underwater objects.

As modern, very quiet submarine platforms become operational in large numbers, new methods of detecting very low level signals from these quiet submarine platforms are desired, especially in the presence of high noise levels from surface shipping, wind, biologics, and other sources of ambient noise. Currently, post processing narrowband beamformed data from sonar arrays is performed by spectrally flattening, or whitening a selected beam's data by use of a noise spectral equalization (nse) algorithm and displaying the resulting signal-to-noise (SNR) as several shades of gray on a LOFARGRAM display. There are several disadvantages to this type of algorithm and display. First, the beamformed data and threshold are discarded and eliminated from the detection process. Second, the beamformed data from one beam are not compared to adjacent spatial beams to compare relative levels, and therefore, beamformed data are thresholded independently for all beams. Third, beamformed data are assumed to contain energy of interest only in very narrow frequency bands (<0.1 Hz) or in very broadbands (>25 Hz), and energy of intermediate bandwidths (BWs) are not addressed by current post processing algorithms. Modern submarine platforms of interest radiate energy in all bandwidths and an algorithm is desired to be developed for the detection of energy in all bandwidths.

SUMMARY OF THE INVENTION

Therefore, it is an object of the present invention to provide a system that detects and measures energy in all bandwidth emanating from an underwater object.

Another object of the present invention to improve detection of signals present in noisy backgrounds.

In addition, it is an object of the present invention to provide a system having improved detection of signals of interest emanating from submerged objects.

Accordingly, the current invention provides a method and apparatus for detecting, processing and tracking sonar signals to provide bearing, range and depth information that locates an object in three-dimensions underwater space. A Twenty Six Nearest Neighbor Peak Picker (TSNNPP) is disclosed that improves the detection of signals in noisy background by differentiating bandwidth (BW) characteristics of signals from BW characteristics of noise.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 2 illustrates the operation of an eight nearest neighbor peak picker (ENNPP) algorithm that is part of the background of the present invention;

DESCRIPTION OF THE PREFERRED EMBODIMENTS

The present invention is an improvement of the invention described in U.S. Pat. No. 5,481,505 which is herein incorporated by reference. The present invention incorporates a herein termed "Twenty Six Nearest Neighbor Peak Picker (TSNNPP)" technique. The TSNNPP is an extension of the "Eight Nearest Neighbor Peak Picker (ENNPP)" which is completely described in U.S. Pat. No. 5,481,505. For the sake of brevity, the details of the operation of the system of U.S. Pat. No. 5,481,505, although applicable to the present invention, are not repeated herein, but rather are referenced as needed.

In general, the TSNNPP technique of the present invention determines relative maxima in beam levels on a frequency-azimuth-bandwidth (FRAZBW) surface at the output of a beamformer. Detection is enhanced for passive sonar systems for picking, peaks on the four dimensional FRAZBW surface rather than the commonly used FRAZ surface, especially if the Fourier Integral Method (FIM) algorithm is used as the beamforming method. The present invention may be further described with reference to FIG. 1.

Figure 1:
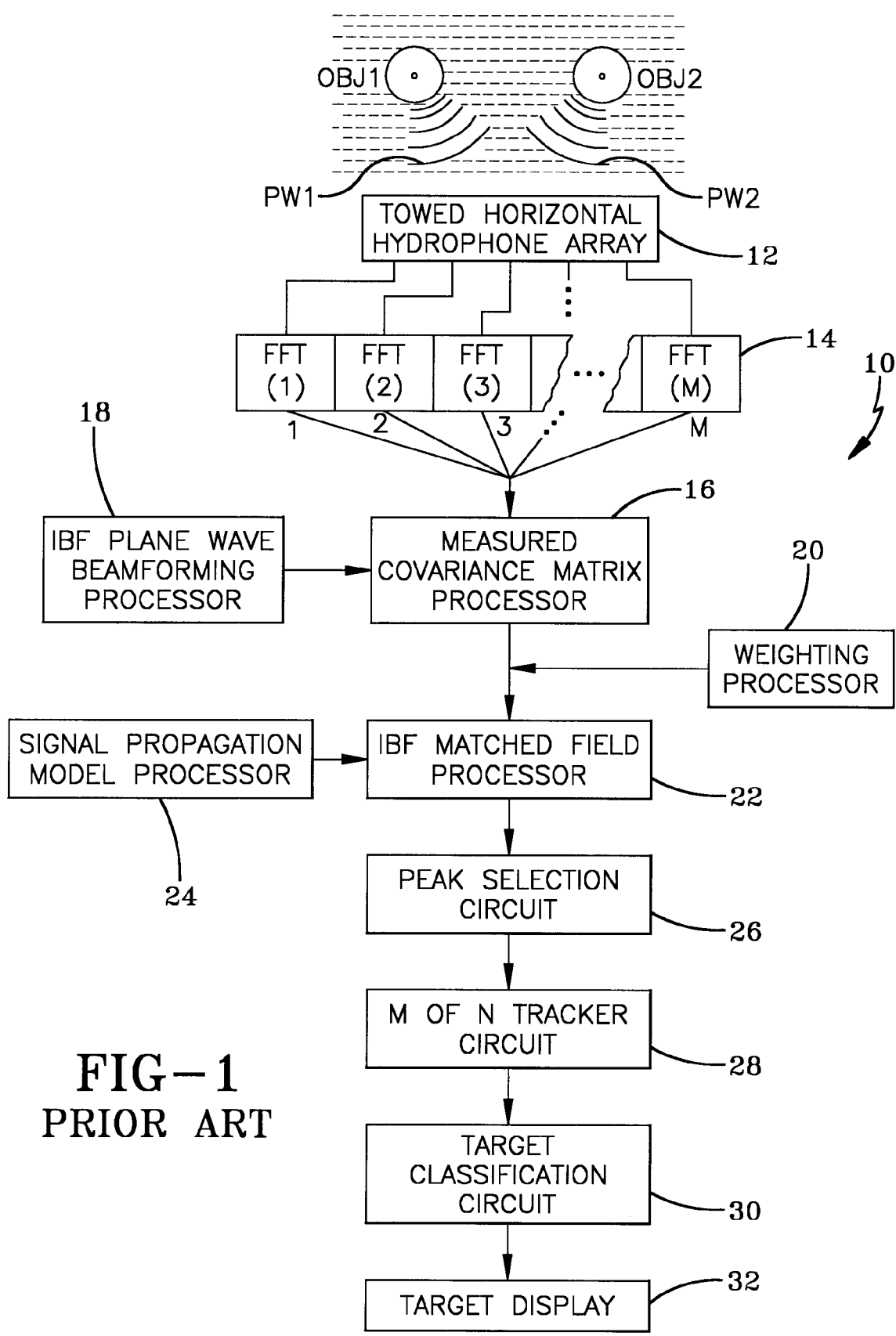
FIG. 1 is a block diagram of the prior art system incorporated into the present invention.

The apparatus 10 shown in FIG. 1 includes a towed horizontal hydrophone array 12 that receives acoustic signals in the water for all potential sources including any underwater objects. OBJ1 and OBJ2 represent two objects that produce acoustic signals that radiate as multiple plane waves PW1 and PW2 respectively. Fast Fourier Transform (FFT) processors 14, shown as individual processors FFT(1) . . . FFT(M), process signals from corresponding ones of M spaced hydrophones in the array 12. A conventional measured covariance matrix processor 16 receives the output signals from the FFT processors 14 and interacts with an inverse beamforming plane wave beamformer processor 18 for producing an estimated bearing to a possible object.

The remaining portions of the apparatus 10 utilize the estimated bearing signal from the inverse beamforming plane wave beamformer 18 and covariance matrix data supplied by the measured covariance matrix processor 16 to produce beam values for each of a plurality of incremental ranges and depths along the estimated bearing. A weighting processor 20 can provide appropriate weighting functions for the output of the measured covariance matrix processor 16.

An inverse beamforming matched field processor 22 uses the output of the measured covariance matrix processor 16 in its original or weighted form and signals from a signal propagation model processor 24. The processor 24 models the signal propagation path characteristics from each of a plurality of incremental locations located at incremental ranges and depths along the estimated bearing. The IBF matched field processor 22 then generates a correlation value for each such incremental location. A peak selection circuit 26 selects those incremental locations that exhibit a maximum with respect to adjacent incremental locations. The foregoing processors operate iteratively over time.

An "M of N" tracker circuit 28 comprises a processor that utilizes the succession signals from the peak selection circuit 16 during each iteration to eliminate false targets and enable a target classification circuit 30 to classify a possible object as a target. A target display 32 provides the track of the bearing and range to and depth of each target over time.

As previously mentioned, the TSNNPP technique of the present invention is an extension of the ENNPP technique more fully described in U.S. Pat. No. 5,481,505. The operation of the ENNPP is illustrated in FIG. 2, more fully described in U.S. Pat. No. 5,581,505, and results in the detection of all the peaks relative maxima in beamformed levels on the beamformed FRAZ surface for a given time epoch, also more fully described in U.S. Pat. No. 5,481,505. A peak or relative maxima, beam level can be described by the following parameters: level; frequency; azimuth angle; azimuthal width; elevation angle; elevation angle width; and time.

Beam level on the FRAZ surface as a function of time is input to the ENNPP and tracked by the Inverse Beamforming M of N tracker circuit 28 in a manner as more fully described in U.S. Pat. No. 5,481,505. In the current invention, bandwidth is added to the parameter list above describing a beam level peak, or relative maxima, in the practice of the present invention. Since sources of interest in detection are assumed to be point sources, azimuthal angle width and elevation angle width are not used in the peak picking process of the present invention.

Figure 3:
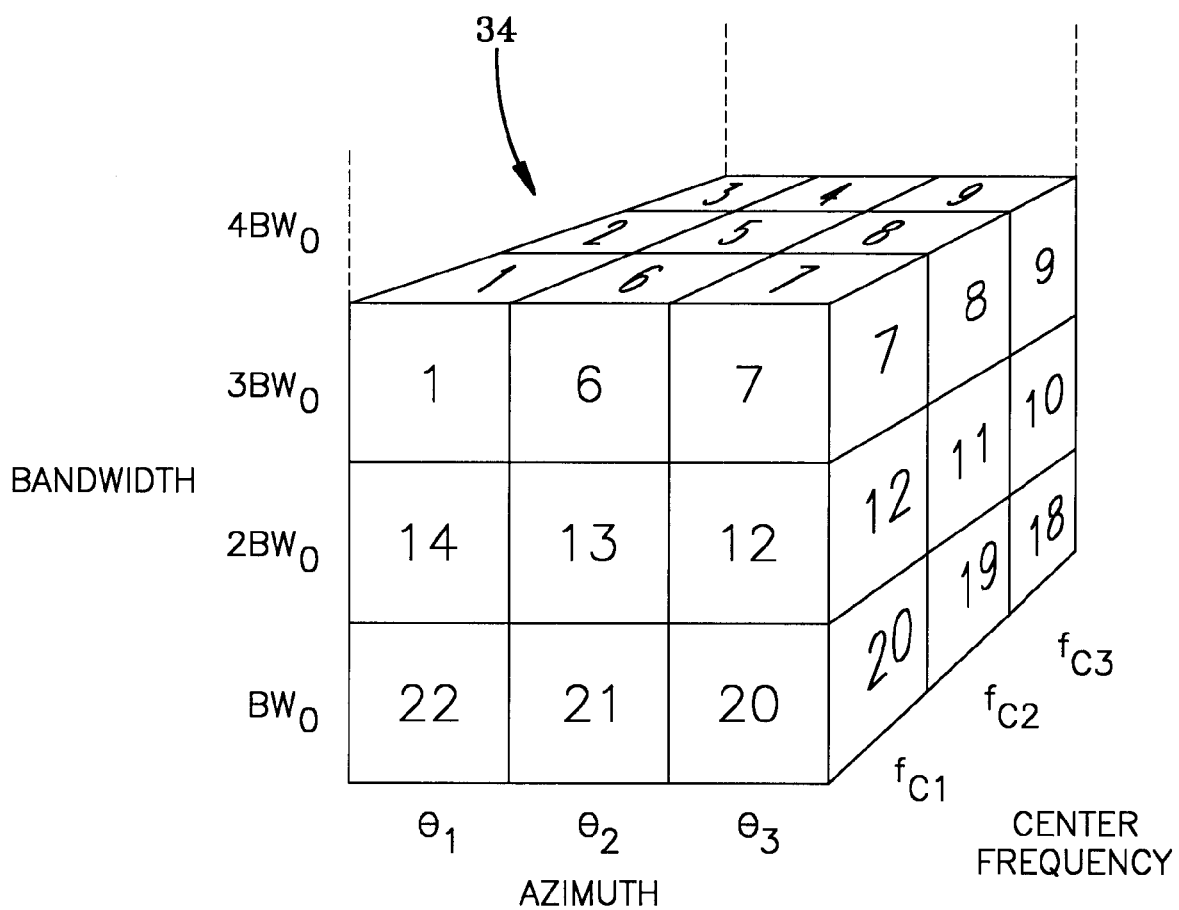
FIG. 3 illustrates the operation of a twenty-six nearest neighbor peak picker (TSNNPP) routine of the present invention.
Figure 4:
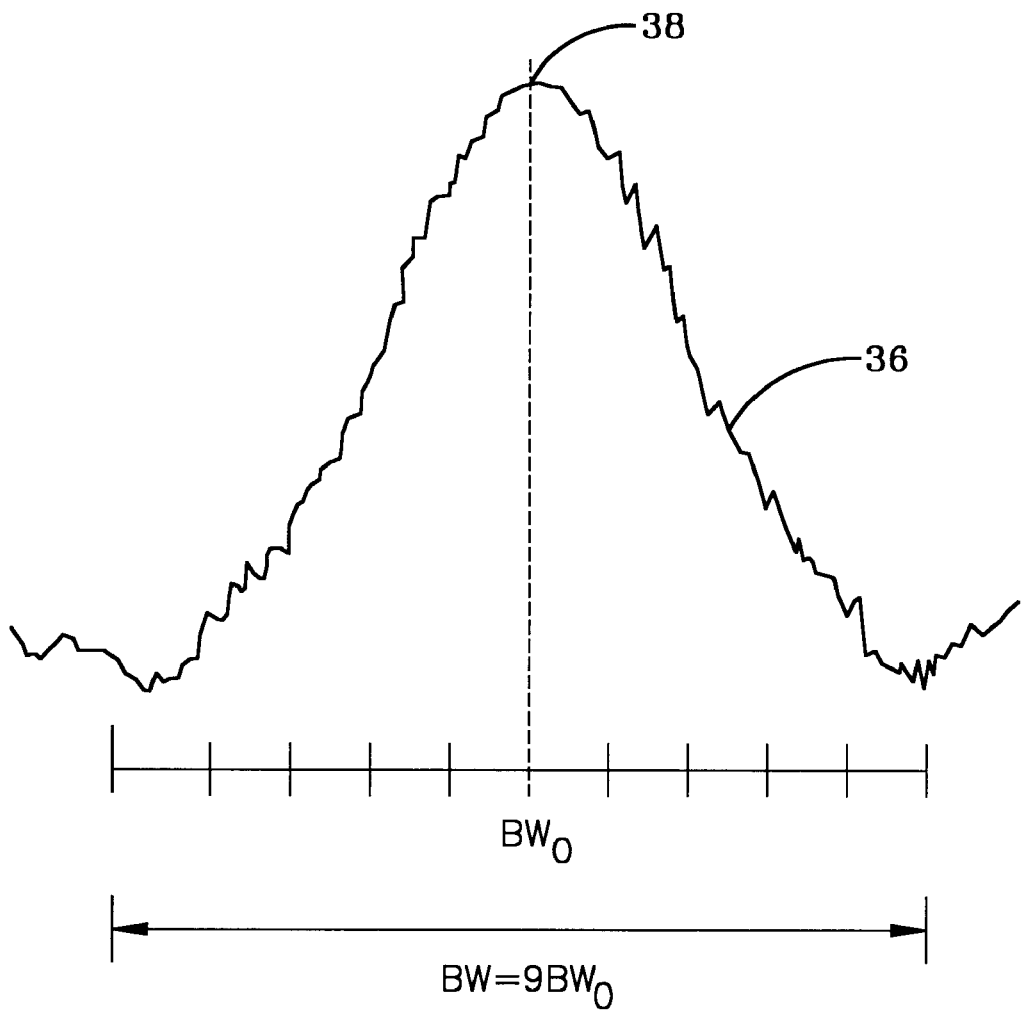
FIG. 4 illustrates the response associated with the operation of the TSNNPP routine of FIG. 3.

The bandwidth of the peak beam level may be further described with reference to FIGS. 3 and 4, wherein FIG. 3 illustrates the correlation 34, in the form of a block, between the bandwidth, azimuth and center frequency parameters, and FIG. 4 is a response curve 36 of the center frequency $f_c$ of FIG. 3 having a peak 38.

The bandwidth and center frequency, $f_c$, of a peak beam level is determined, as shown in FIG. 3, by first performing a derivative test known in the art. The center frequency $f_c$ being calculated by the bandwidth derivative test has a certain beam level that is examined to see if it qualifies as an ENNPP relative maxima as more fully described in U.S. Pat. No. 5,481,505. If there is no ENNPP peak, or relative maxima, at this center frequency, no bandwidth based peak calculation is made because the beam energy in this frequency bin will certainly not qualify as a peak among its twenty-six nearest neighbors or relative maxima. If the beam level in the center frequency bin being examined is a ENNPP peak as specified in U.S. Pat. No. 5,481,505, the bandwidth based peak calculation illustrated in FIG. 3 is performed.

The bandwidth based peak calculation is performed as follows:

For frequency bins less than the center frequency $f_c$, the following bandwidth peak test will be performed until $BW_L^n$ becomes zero or negative:

$$BW_L^n = \frac{[BL(f_n) - BL(f_{n-1})]}{f_n - f_{n-1}} \quad (1)$$

where
$f_n$=center frequency of the nth frequency bin
BL=beam level
$BW_L^n$=left half bandwidth Likewise, for frequency bins greater than the center frequency, $f_c$, the following derivative test will be performed until $BW_R^n$ becomes zero or positive:

$$BW_R^n = \frac{[BL(f_{n+1}) - BL(f_n)]}{f_{n+1} - f_n} \quad (2)$$

where $BW_R^n$=right hand bandwidth

The total bandwidth (BW) associated with the ENNPP peak, or relative maxima, is defined as:

$$BW=BW_L^n+BW_R^n \quad (3)$$

The peak's bandwidth as defined in Equation (3) is not always greater than the width associated with the beam levels equal to one half of the peak's beam level (commonly called the "3 dB down" or "half power" width). It is the bandwidth defined in Equation (3) that is the parameter associated with the peak, or relative maxima, level input to the M of N tracker circuit 28 more fully described in U.S. Pat. No. 5,481,505.

Any bandwidth less than bandwidth calculated from Equations (1), (2), and (3) will have less total energy, and any bandwidth greater than bandwidth will have less signal energy than ambient noise energy. For this reason, the peak level at center frequency, $f_c$, azimuth $\theta_o$, and bandwidth is greater than the beam levels in all adjacent twenty six nearest neighbor frequency azimuth bandwidth (FRAZBW) cells.

Since most data processors are digital and the frequency spectra of a beam is generated by a Fast Fourier Transform (FFT) there is a minimum bandwidth equal to the frequency resolution of the FFT. Also, all bandwidths determined by Equations (1), (2), and (3) will be integral multiples of this minimum bandwidth shown as $BW_o$ in FIG. 3. For analogue processors, bandwidth can be any arbitrary value.

Finally, peaks found by the above algorithm are processed with the M of N tracker circuit 28, more fully described in U.S. Pat. No. 5,481,505. The M of N tracker preferably has three additional settings to address the peak's bandwidth. First, there is a bandwidth range specifying the minimum and maximum bandwidth to be input to the M of N tracker circuit 28. Second, there is "bandwidth fix" true or false which allows the bandwidth to vary by only a fixed (true) amount, or tolerance, with time about the bandwidth of the first peak in the track or not (false). The third M of N tracker circuit 28 parameter is the magnitude of the bandwidth tolerance. These parameters of bandwidth range, bandwidth fix, and magnitude of the bandwidth tolerance are described in detail in U.S. Pat. No. 5,481,505 for the parameters of frequency and azimuth.

The advantage of adding bandwidth as a parameter input into the M of N tracker circuit 28 is to improve detection of signals in noisy background by differentiating bandwidth characteristics of signals from bandwidth characteristics of noise. Signals of interest in this case are submarines operating submerged and producing signals of finite, but relatively stable bandwidth. Noise comes from various sources including surface shipping, wind, waves, marine life, seismic activity, and seismic profilers. The noise sources originating from the sea surface (shipping, wind, waves, and seismic profiling) will be highly unstable in levels and bandwidth due to multipath propagation from near surface source depths. The other noise sources originating below the surface are very minor in level and dominated by the near surface noise sources. This use of bandwidth in the practice of the present invention, therefore, improves detection of submerged signals of interest.

It will be understood that various changes in the details, steps and arrangements of parts, which have been herein described and illustrated in order to explain the nature of the invention, may be made to those skilled in the art within the principle and scope of the invention as expressed in the independent claims.

What is claimed is:

1. A method for locating, in three-dimensional space and in relation to a predetermined location, an object emitting acoustic signals comprising the steps of:

deploying an array of acoustic transducers;

receiving acoustic signals at said deployed array including the acoustic signals from the object;

estimating a bearing from the predetermined location to the object in response to the received acoustic signals, said estimating including inverse beamforming processing the signals from each transducer in said deployed array using different frequencies and multipath analysis of said received acoustic signals;

repeatedly generating beam values for acoustic signals received by said deployed array from different incremental locations at incremental ranges and depths along the estimated bearing whereby bearing, depth and range information are provided as a function of time and a correlation value is obtained for each acoustic frequency and for each incremental location;

selecting an individual incremental location with a peak beam value based upon an inverse beamformer twenty-six nearest neighbor peak picker analysis comprising the steps of;

determining the center frequency of the received frequencies;

segmenting the received frequencies into n frequency bins greater than and less than the determined center frequency;

calculating the left half bandwidth of the peak beam values received for frequency bins less than the center frequency until the left half bandwidth $BW_L^n$ becomes zero or negative;

calculating the right half bandwidth of the peak values received for frequency bins greater than the center frequencies until the right hand bandwidth $BW_R^n$ becomes zero or positive;

adding the calculated left half bandwidth $BW_L^n$ to the calculated right half bandwidth $BW_R^n$ to obtain the total bandwidth, BW, said total bandwidth defining said selected individual incremental location; and providing bearing, range and depth information from the predetermined location to the selected incremental location thereby locating the object in three-dimensional space.

2. The method according to claim 1 wherein:

said step of calculating the left half bandwidth utilizes the formula:

$$BW_L^n = \frac{[BL(f_n) - BL(f_{n-1})]}{f_n - f_{n-1}}; \text{ and}$$

said step of calculating the right hand bandwidth utilizes the formula:

$$BW_R^n = \frac{[BL(f_{n+1}) - BL(f_n)]}{f_{n+1} - f_n}$$

wherein $f_n$ represents the center frequency of the n th frequency bin; and

BL represents the beam level.

3. An apparatus for locating, in three-dimensional space and in relation to a predetermined location, an object emitting acoustic signals comprising:

receiver means having a towed horizontal array of transducers for obtaining acoustic signals including the acoustic signals from the object, said acoustic signals having a plurality of frequencies;

an estimating means connected to said receiver means and responsive to the obtained acoustic signals for estimating the bearing to the object;

a beam value generating means joined to said estimating means for generating beam values for the obtained acoustic signals from different incremental locations at incremental ranges and depths along the estimated bearing;

a location selection means joined to said estimating means and said beam value generating means, said location selection means further including:

means for determining the center frequency of the obtained acoustic signals joined to receive the obtained acoustic signals;

means for segmenting the obtained acoustic signals into a plurality of frequency bins, n, said plurality of bins comprising right half bins having frequencies greater than the center frequency and left half bins having frequencies less than the center frequency, said means for segmenting being joined to said means for determining;

left half bandwidth calculation means joined to said means for segmenting and calculating the bandwidth of the peak beam values in the left half bins of segmented acoustic signals until the left half bandwidth $BW_L^n$ becomes zero or negative;

right half bandwidth calculation means joined to said means for segmenting and calculating the bandwidth of the peak beam values in the right half bins of segmented acoustic signals until the right half bandwidth $BW_R^n$ becomes zero or positive;

adding means joined to said left half calculation means and said right half calculation means for determining the total bandwidth, BW, as being equal to the sum of the left half bandwidth peak values added to the sum of the right half bandwidth peak values which defines a selected incremental location;

a calculating means is joined to said location selection means for calculating the bearing, range and depth from the predetermined location to the selected incremental location thereby locating the object in three-dimensional space; and a display means for displaying the calculated bearing, range and depth joined to said calculating means.

4. The apparatus according to claim 3 wherein:

said left half bandwidth calculation means utilizes the formula:

$$BW_L^n = \frac{[BL(f_n) - BL(f_{n-1})]}{f_n - f_{n-1}}; \text{ and}$$

said right half bandwidth calculation means utilizes the formula:

$$BW_R^n = \frac{[BL(f_{n+1}) - BL(f_n)]}{f_{n+1} - f_n}$$

wherein:

$f_n$ represents the center frequency of the n th frequency bin; and

BL represents the beam level.

* * * * *